United States Patent [19]

Pedrini

[11] 4,210,072

[45] Jul. 1, 1980

[54] PORTABLE COOKING APPARATUS SUITABLE AS AN OVEN OR AS A GRILL

[76] Inventor: Ivano Pedrini, Via dei Mille, 22-S Giuliano Milarese (Milano), Italy

[21] Appl. No.: 924,845

[22] Filed: Jul. 14, 1978

[30] Foreign Application Priority Data

Feb. 2, 1978 [IT] Italy .............................. 19925 A/78
Apr. 3, 1978 [IT] Italy .............................. 21936 A/78

[51] Int. Cl.² ........................................... A47J 37/06
[52] U.S. Cl. ........................................ 99/340; 99/447
[58] Field of Search ............... 99/340, 422, 447, 401, 99/376

[56] References Cited

U.S. PATENT DOCUMENTS

| | | | |
|---|---|---|---|
| 3,301,172 | 1/1967 | Haro | 99/447 X |
| 3,786,741 | 1/1974 | Plumley et al. | 99/447 |
| 4,011,431 | 3/1977 | Levin | 99/340 |

FOREIGN PATENT DOCUMENTS 213405  5/1941  Switzerland .............................. 99/447

*Primary Examiner*—George F. Mautz
*Attorney, Agent, or Firm*—Bucknam and Archer

[57] ABSTRACT

An apparatus for heating or cooking food is described which comprises a plate forming the hot horizontal surface on which the food to be cooked is placed, at least a heating source underlying the plate, a cover above said plate, which defines a mainly closed space. The metal plate has high thermal conductivity. Preferably, the plate has a raised edge effective to circumscribe and define a space for locating and containing the food. The plate may be inverted and the apparatus may be used as an open grill. In this arrangement heat is transmitted by conduction. The plate is provided with essentially vertically extending passages located, in the perimetral parts of the plate, in section in vertical planes, in such a way that the lower mouth or inlet of said passages fully communicates with the space underlying the plate so that active circulation of superheated air is established between the space underlying the plate and the space above the plate and defined in the inside of said cover. When the plate is inverted, circulation is prevented or at least strongly hindered, thereby the heat irradiated by the source of heat is transmitted, substantially completely, to and respectively through the planar portion of said plate.

8 Claims, 9 Drawing Figures

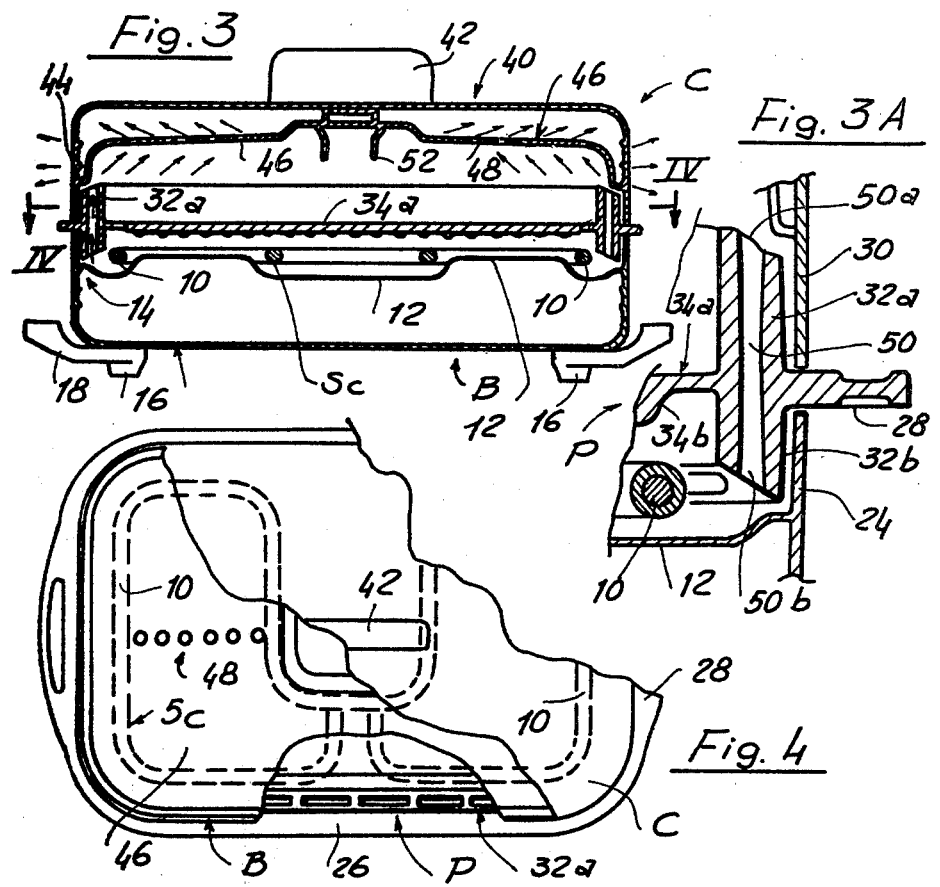
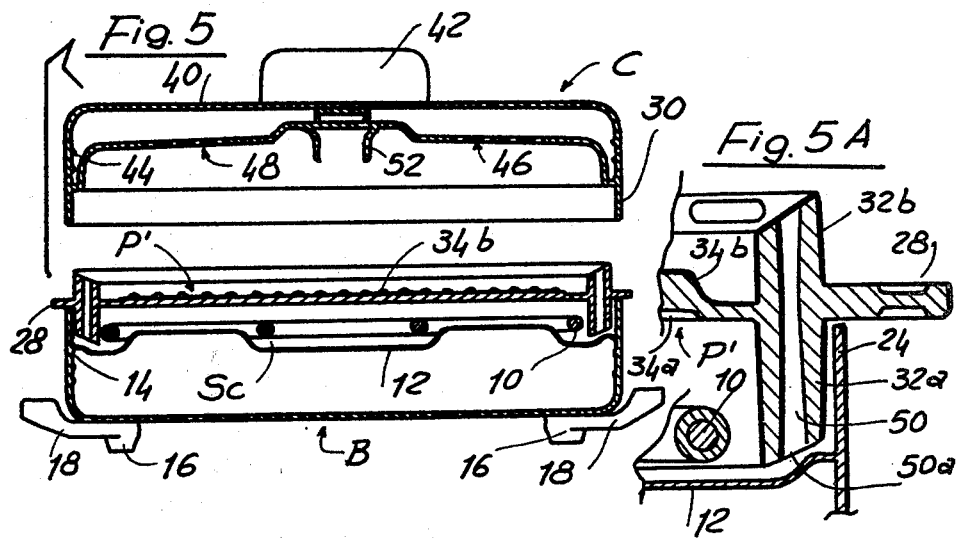

PORTABLE COOKING APPARATUS SUITABLE AS AN OVEN OR AS A GRILL

The present invention relates generally to an apparatus or device mainly but not exclusively suitable for home use and for small communities, which may be used, if desired, outdoors for cooking foodstuffs, the cooking being carried out by heating, the food being located on a heated support structure such as a plate, a baking pan, a grate or the like.

It is well known that the number of foodstuffs which are cooked for a single person or for a small group of people, which are cooked on a baking pan, a grill or a plate, has increased. To this end the industrial production of several cooking apparatuses and devices effective to prepare several types of foods, in comparatively small amounts, suitable for use to be consumed by small groups of people to be used at home, eventually outdoors, during small gatherings in the country or the like, the apparatuses being preferably of small size and weight and being easily transported and used on the field and in the proximity of the place of use, has increased.

Within the scope of the invention, will be considered the apparatus of the grate or grill type of cooking and in general apparatus in which the food is cooked on a very hot metal surface. A typical but not exclusive example of these apparatuses is represented by the so-called "beefsteakers", the apparatus for cooking different types of wafers or pies and the like, in which the metal surface to be heated is double or is formed by two plates which are located in front of the substance to be cooked. In other cases on the contrary, only one heated metal surface is used on which the raw substance is simply laid. Due to reasons of transportability, cleaning reasons and the like, the heating source or sources most frequently used in these cooking apparatus are formed by electrical resistances, the term "heating source" being used in the following description also including any other suitable heating source, for example gas burners, which may be supplied by gas and gaseous mixtures as stored and transported in bottles in a liquefied condition and other means suitable to irradiate heat as produced for example by high frequency, ultra-sound and the like, and also by solid fuels such as wood coal.

Pizza is also known, the use and consumption of which, in substitution to and as a complement of other more conventional types of foods, widely produced and serviced in restaurant, "pizzerie", and in general in public rooms able to produce and cook foods in comparatively large amounts, has increased.

Apart from the specific details and variations of manufacture, the "pizza" is a food comprising, as the essential component thereof, a flour and water dough, with the addition of yeast and other ingredients, prepared in the form of a layer having in general a thickness of few millimeters, covered by tomato and usually by a layer of comparatively low temperature meltable cheese, this dough layer being cooked and caused to leaven on a baking pan or tray having a raised edge to circumscribe and "contain" the product or composition being cooked.

This dough contains a comparatively high amount of water. The cooking process comprises, basically, the elimination of water and the completion of several structure changes and dough consolidating phenomena. The good success of this process, being essential to provide the pizza with the taste and the desired properties, involves that several conditions be met and in particular the homogeneity of the cooking, elimination in an essentially complete and even degree of the water at any points and levels of the dough layer and the formation within the desired limits depending on the taste of a more or less crisp layer but free or essentially free of carbonization that is not burned. In actual practice, these conditions are met only by cooking the pizza, the dough of which is placed on a suitable baking pan, in an oven which in turn is brought to and maintained at a temperature generally of the order of 300+, due to the fact that the cooking of the pizza is, from a certain point of view, similar to that of bread based products and in general of the flour based products. The eveness or smoothness of the temperature in an oven and the heat contribution, mainly by irradiation, in any part of the composition being cooked, practically form the essential parameters depending on which the aforesaid conditions are satisfactorily met.

It occurs therefore, and the above assertions have been frequently confirmed, that a rational and satisfactorily preparation of the pizza cannot be obtained by using portable cooking devices of the type originally considered and available on the market, either of the closed chamber provided with a double plate or grate, or of the open chamber type, such as of the grill type, beafsteakers or the like, in which the product is cooked, on a very hot metal surface while it is completely or near completely exposed to the outside environment. Accordingly, the failure of these efforts has confirmed that successful cooking of the pizza may be carried out only by suitable ovens, even though of a familiar type and size.

In the light of the above description, it is the main object of the present invention to provide a cooking apparatus of the portable type and high productivity within the limits of the preparation of amounts of foods for a comparatively small number of consumers, comparable to that of conventional home apparatus or electrical household appliances, for example beafsteakers, improved in such as way as to meet the particular requirements related to the cooking of the pizza. This property of the instant improved apparatus which, within the knowledge limits of the Applicant, has never been reached or satisfactorily approached, is mainly due to the fact that the apparatus according to the invention comprises, in combination with a heating source mainly extending in one plane, designed to be essentially horizontal as the apparatus is in operation and a cooking plate effective to be evenly and homogeneously heated by this source and provided, at least in the upper face thereof, with a surface effective to receive the dough to be cooked, a closure means practically a "cap or cover" capable of covering and enclosing the space immediately above the plate and of providing in the space such thermal and essentially hygroscopic conditions as to be similar to those which occur and are maintained in the interior of an oven suitable for cooking pizza.

The properties of the above described apparatus are further achieved by the achievement of at least some of the following conditions and structural technical characteristics:

the cooking plate has to be contoured by a raised edge having such a height as to be sufficient to enclose and contain the crude layer dough, and the same layer during the leavening phenomena, in addition to the ingredients (the tomato and cheese which melts during the cooking and the like) which it is desired to be placed above the pizza itself;

the same cooking plate has to offer, also in combination, the characteristics of a comparatively high thermal mass and a high thermal conductivity, in order to obtain a progressive and strictly even heating on its entire surface contacting the substances to be cooked; preferably this plate is formed, rigidly to its raised edge thereof, by a metal or metal alloy melt, the metal alloy being preferably based on aluminium, effective to assure both said requirements;

the cap or cover is geometrically shaped as to leave a certain space above the pizza being cooked, and preferably comprises openings so located and oriented as to allow for the escape of the vapour or steam formed during the cooking and, in addition, of any water which may form due to the condensation of said steam so as to obtain a very low moisture content in the interior of this space. Preferably, these conditions require that the upper wall of the cap does not include passages and/or include a thermoinsulating gap or such a gap as to prevent a quick upward dissipation of the heat.

In particular, the present invention relates to technical solutions and means effective to enhance this double and essentially antithetic property of selectively fitting to the several types of cooking among which, in particular:

cooking types which require a substantial transfer of the thermal energy, which is developed under the plate, to the above environment which practically acts as an "oven chamber" and which has to reach temperatures neatly greater than 100° C. and sometimes even greater than 160° C. in order to accelerate the removal of the steam and volative components;

cooking types, of the "grill" type, in which the main requirement is that of providing a superheated plate, the upper surface of which is able to reach very high temperatures, for example of the order of 200° C. and above, to give quickly heat by contact, and secondarily by irradiation, to the food located over.

The apparatus according to the present invention is further characterized in that it comprises, on the plate outline and in the space enclosing the surface carrying the edible substances to be cooked and in particular in the thickness of the raised edge bilaterally defining the space and forming a containing pan for the edible foods and related juices, a plurality of passages through which selectively, in particular depending on the location imposed on said plate, passed the air brought to high temperature by the heating source in turn located under said plate.

The aforesaid and other more specific characteristics of the invention will be now described in the following detailed description of a preferred and not limitative exemplificative embodiment of the instant apparatus illustrated in the figures of the accompanying drawings, where:

FIG. 1 is a section taken through a symmetry vertical plane of the apparatus illustrating the main components thereof, in the respective position of the components for the assembling of the apparatus itself in order to typically "oven" cook foods such as pizza, pies, lasagne, various types of gratined pasta, chestnut-tart and the like;

FIG. 1A illustrates the "plate" component in an inverted position, to be adopted in the apparatus, without cover for typical uses such as "beafsteaker" and in general in the "grill" cooking; in this position the use of the grill is not however excluded, the grill being provided with the related cover, eventually free of the shield or inner gap for other uses, for example for maintaining the heat and/or subsequent heating of already cooked foods;

FIG. 3 illustrates the apparatus as predisposed for the service for cooking pizza or like edible products, by means of the assembly with the components illustrated and oriented as schematically shown in FIG. 1;

FIG. 3A is a fragmentary and enlarged scale view of an end portion including the grill outline, of the apparatus of FIG. 3;

FIG. 4 illustrates the apparatus of FIG. 3 by a partial top view and a partial bottom view, in section through the plane indicated by IV—IV in FIG. 3 to allow for the observation of some structural details;

FIG. 5 is a section corresponding to that of FIG. 3 and illustrating the apparatus predisposed for the grill cooking, jointly to the cover which may be selectively superimposed thereonto, and FIG. 5A illustrates, in the conditions indicated with respect to FIG. 3A, a detail of FIG. 5 including a portion of the grill outline.

Figure 1:
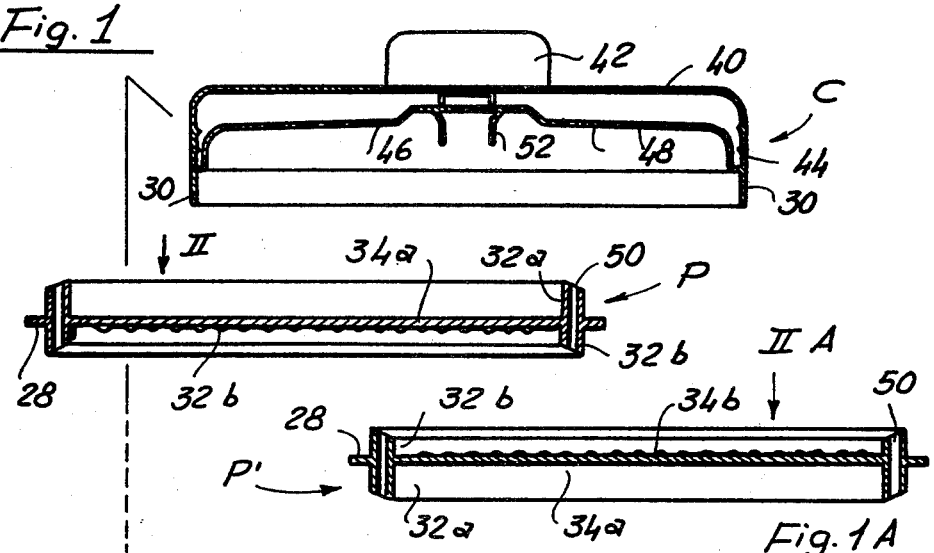
Figure 1A:
Figures 2, 2A:
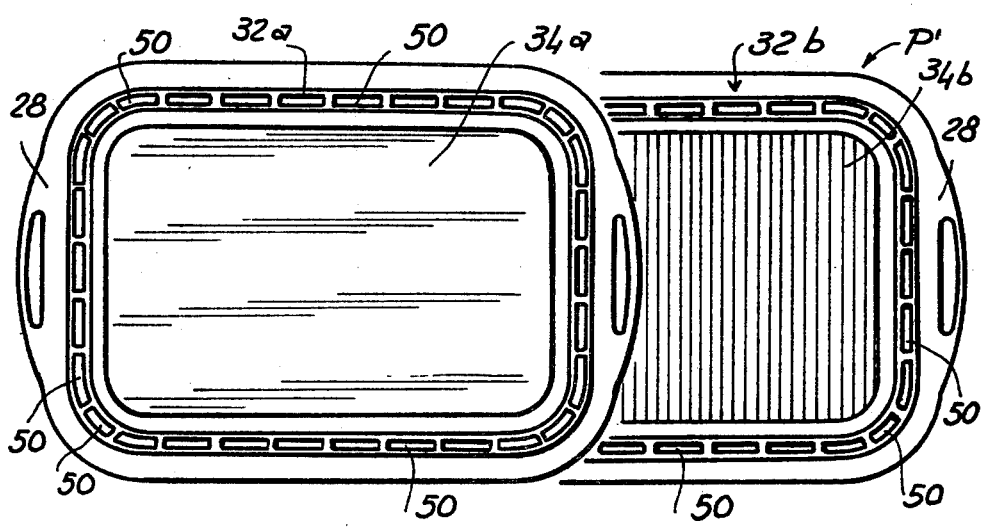
FIGS. 2 and 2A illustrate the grill in plan and as seen from the directions indicated by II in FIG. 1 and respectively by IIA in FIG. 1A, i.e. in the mutually inverted positions, in which the plate is predisposed for the service in the different cooking conditions thereof, which will be detailed thereinafter.

Referring particularly to the figures in which the same numbers and characters indicate the same or equivalent parts, components and elements, the apparatus will be mainly described with respect to the conditions thereof for cooking pizza, i.e. to provide those functions which, as it was previously described, are practically not achievable by the existing portable types of cooking devices and means, without however excluding the grill cooking conditions, to which the apparatus according to the present invention is perfectly fitted, the conditions being in turn pointed out with respect to the cooking conditions of the pizza and the "oven" type of cooking conditions.

The apparatus is essentially formed by the combination of a base portion B containing the heating source Sc of the plate P and a cap or cover C which, superimposed on the plate encloses on the plate a space in which thermal and environmental conditions build up which are similar to those of an oven. The cover comprises rest legs or feet 16 provided with handles 18.

The plate P, made in general of a metal melt or a high thermal conductibility metal alloy, comprises a planar portion the opposing faces 34a and 34b of which are smooth and ribbed or notched respectively. The opposing surfaces are outlined by raised edges 32a and 32b respectively, so that plate which forms a ray or pan effective to enclose within its perimeter the edible foods superimposed thereon.

At least the surfaces which have to contact the edible foods to be cooked are covered by an anti-adhesive and water and oil repellant layer, in general consisting of a tetrafluoroethylene resin effective to resist against the apparatus temperatures.

Under the top portion 40 of the cover C, a diaphragm 46 is located so as to form an essentially non-conducting interspace.

The diaphragm 46 is mounted in such a way as to be removable, for example by unhooking or releasing a resilient cooking system 52, to obtain the double effect of permitting a complete cleaning of any portions of the cover and to loosen the latter even without the diaphragm, to form a chamber protected from the outer environment but in which the greater rate of thermal exchange (due to the circulation of the air and/or by irradiation) assures that, above the plate, or more limited heating builds up, for example of the order of about 70°–90° C., in such a way as to be capable of allowing the apparatus to be used as food-heater, for slowly cooking foods requesting this type of cooking, for example meats in juices and the like.

A main characteristic of the present invention is that, depending whether the orientation of the plate P is "right" (as in FIGS. 1, 3 and 3A) i.e. the smooth surface 34a of said plate is upwardly directed, or "inverted", i.e the indented surface thereof is upwardly directed, and hence in the position indicated by P' in FIGS. 1A, 2, 5 and 5A, a drastic modification of the thermal conditions in the space above the plate and the upper surface (34a or 34b) of the plate itself is obtained.

This particularly important effect is mainly due to the shape, in section in the vertical planes, of the plate outline portions 32a and 32b, being coordinated to the location of at least a part of the electrical resistances in particular of the reinforced resistances 10 constituting the heating source Sc, which may be also of a different type.

Characteristically, and as particularly shown in the details of FIGS. 3A and 5A, in the thickness suitably increased of the plate perimetrical portions, passages 50 are formed in particular a crown of passages (FIGS. 2 and 2A) extending all along the height of these perimetric portions. Moreover, the upper and lower edges of the parts 32a and 32b are slanted either as shown or in an equivalent manner. At last, the perimetric portions of the electrical resistance 10, the outline of which, in plan is fragmentarily reproduced by dashed lines in FIG. 4, are located in such a way as to run all along inner lengths but near the perimetric outline, also in plan, of the outline portions 32a and 32b of the center planar portion of the plate.

The apparatus, assembled as shown in FIGS. 3 and 3A is predisposed to assure the optimal efficiency thereof for an "oven" type of cooking of foods, in particular of pizza. In FIG. 3 a set of small arrows indicates the heated air circuit tending towards raising during the operation of the apparatus.

The heat irradiated by the source Sc obviously impinges on the plate, thereby heating the plate by irradiation, in addition to heating the space between the plate and the underlying diaphragm 12 protecting and carrying the resistance 10, the diaphragm being perforated, in particular in the centre portion, to assure the air inlet and exchange. The heated air escapes to the outside and upon touching the perimetic portion of the resistance 10, heat reaches the lower opening 50b (facing said resistance) of the passages 50, moving upwardly along the passages and escaping from the upper opening or slots 50a thereof to penetrate the overhanging space under the diaphragm 46, evacuating through holes, for example as indicated at 48, and then reaching the outlet slots or opening 44. This circulation allows the air to give the greatest part of its heat to the environment above the plate, thereby providing the desired effect of heating, drying and cooking the upper layers of the food material (for example a pizza) located onto the pan formed by the plate itself.

By locating said plate in the inverted position P' thereof, and as it is represented in the lower portion of FIG. 5, and in particular in FIG. 5A, the edge or marginal portion 32a of the plate is downwardly directed and it extends as far as the perimetric portion of the diaphragm 12, and preferably it substantially extends as far as under the level of the resistance 10.

Under these conditions the superheated air from the heating source is practically prevented from reaching the openings 50a, which are now the lower openings, of the passages 50, the slanting of the lower edge of the portion 32a, including the opening 50a, contributing to oppose the air movement. Accordingly, practically all the thermal energy irradiated by the resistance 10 impinges on the face 34a, which is now the lower face of the plate, the planar portion of which transmits heat by conduction to give heat by contact, to the foods located on the face 34b, which is now the upper face of the plate. In this manner, the most favourable conditions for carrying out "grill" types of cooking occur, typically for the use of an apparatus such as a beafsteaker in general without using the cover C thereof. Of course this cover, optionally free of the inner diaphragm 46 thereof, could be used also under these conditions, for example to maintain the heat of the cooked food or to provide the subsequent heating on the same surface on which the cooking has been carried out.

However, the improved described apparatus may be carried out by adopting several variations and modifications of structural nature, without departing from the scope of the invention as particularly defined by the following claims.

I claim:

1. A portable cooking apparatus comprising a base, horizontal heating means located in said base, a cooking plate adapted to be heated by said horizontal heating means, said apparatus being used in a first position of said cooking plate as an oven and in a second position of said cooking plate as a grill, cover means adapted to cover said plate so as to leave a gap above said plate, said plate having raised edges, which project vertically to engage said cover means, said cover means having means for the escape of the vapors, said plate being provided perimetrically in said raised edges with conduit means, said plate having a first essentially flat surface and a second ribbed surface, said conduit means having a shape which allows direct circulation of hot air from said heating means to the food placed on the flat surface of the plate when the plate is used in said first position, said plate being invertible and being selectively used in said first position as an oven and in said second position as a grill, the food being placed on said ribbed surface of the plate when the apparatus is used in said second position, heat being transmitted by radiation and conduction through said plate in said first position and the hot air being inhibited from rising through said conduit means in said second position.

2. The apparatus according to claim 1 wherein said conduit means are slanted.

3. The apparatus according to claim 1 wherein said cover means is a cover and a diaphragm is located under the top of said cover whereby an essentially non-conducting interspace is provided in the gap above the food to be cooked between said cover and said diaphragm.

4. The apparatus according to claim 1 wherein said heating means consists of electrical resistance elements, the ends thereof being in the proximity of said raised edges.

5. The apparatus according to claim 4 wherein said flat surface of the plate is upwardly directed during said first position, the ribbed surface is upwardly directed during said second position and the raised edge of the flat surface projects to an extent greater than the raised edge of the ribbed surface, said raised edge of the flat surface, when the plate is inverted and is used in said second position, inhibiting the flow of heated air from the space below the plate.

6. The apparatus according to claim 5 wherein when said plate is adapted to cook food in said second position, said raised edge of said flat surface is downwardly directed and extends under said electrical resistance elements whereby the flow of heated air is inhibited from reaching said conduit means, heat is irradiated to said first flat surface of the plate and heat is transmitted therefrom by conduction to said second ribbed surface.

7. The apparatus according to claim 5 wherein in said first position said raised edge of the flat surface is upwardly directed and said raised edge of the ribbed surface extends downwardly to the level of said resistance elements and the lower end of said conduit means communicates with the area in which the resistance elements are located, air heated by the electrical resistance elements moves upwardly through said conduit means and heats said space below the cover.

8. The apparatus according to claim 5 wherein the plate is made of an aluminum alloy.

* * * * *